United States Patent
Winter et al.

(10) Patent No.: US 8,838,623 B2
(45) Date of Patent: Sep. 16, 2014

(54) SYSTEM AND METHOD FOR LOCKING CONTEXT OF SETS OF MEMBERS IN CROSSTABS

(75) Inventors: Stewart Winter, Metcalfe (CA); Andrew Leikucs, Ottawa (CA); Randy Westman, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1381 days.

(21) Appl. No.: 11/472,818

(22) Filed: Jun. 22, 2006

(65) Prior Publication Data
US 2008/0208862 A1  Aug. 28, 2008

(51) Int. Cl.
*G06F 7/00* (2006.01)
*G06F 17/30* (2006.01)

(52) U.S. Cl.
USPC .......................................... 707/754; 707/803

(58) Field of Classification Search
USPC ............ 707/8, 4, 2, 101, 602, 603, 736, 754, 707/796, 803; 345/440; 715/210, 212
See application file for complete search history.

(56) References Cited

U.S. PATENT DOCUMENTS

| | | | | |
|---|---|---|---|---|
| 5,596,754 A | * | 1/1997 | Lomet | 710/200 |
| 5,915,257 A | * | 6/1999 | Gartung et al. | 715/210 |
| 6,633,878 B1 | * | 10/2003 | Underwood | 707/100 |
| 6,750,864 B1 | * | 6/2004 | Anwar | 345/440 |
| 7,139,766 B2 | * | 11/2006 | Thomson et al. | 707/101 |
| 2001/0018694 A1 | * | 8/2001 | Iwamoto et al. | 707/509 |
| 2002/0123986 A1 | * | 9/2002 | Leathers | 707/2 |
| 2002/0166117 A1 | | 11/2002 | Abrams et al. | |
| 2003/0105756 A1 | * | 6/2003 | Daynes | 707/8 |
| 2003/0110242 A1 | | 6/2003 | Brown et al. | |
| 2004/0220933 A1 | * | 11/2004 | Walker | 707/8 |
| 2004/0267897 A1 | | 12/2004 | Hill et al. | |
| 2005/0027843 A1 | | 2/2005 | Bozak et al. | |
| 2005/0188075 A1 | | 8/2005 | Dias et al. | |

OTHER PUBLICATIONS

U.S. Appl. No. 11/473,818, filed Jun. 23, 2006, Adam et al.
C.M. Adam et al., "Scalable Self-Organizing Server Clusters with Quality of Service Objectives," Licentiate Thesis, TRITA-S3-LCN-0509, pp. 1-96.
C. Stewart et al., "Profile-Driven Component Placement for Cluster-Based Online Services," IEEE, vol. 5, Issue 10, pp. 1-6, Oct. 2004.
Z. Li et al., "A Decentralized Agent Framework for Dynamic Composition and Coordination for Automatic Applications," SAACS, pp. 1-5, 2005.
A. Akkerman et al., "Infrastructure for Automatic Dynamic Deployment of J2EE Applications in Distributed Environments," TR2005-867, pp. 1-20, 2005.
K. Appleby et al., "Océano—SLA Based Management of a Computing Utility," Proceedings of the International Symposium on Integrated Network Management, pp. 1-14, May 2001.

(Continued)

*Primary Examiner* — Md. I Uddin
(74) *Attorney, Agent, or Firm* — Shumaker & Sieffert, P.A.

(57) ABSTRACT

A context locking method and system lock context of a set of members in a crosstab for further data exploration and analysis. The context locking system has a context information manager and a locking manager. The context locking method information manager collects context information of the selected member. The context locking method manager locks the context of the selected set based on the context information during further exploration or analysis of the crosstab, while allowing the locked set to reflect data changes in the data source.

23 Claims, 7 Drawing Sheets

(56) References Cited

OTHER PUBLICATIONS

J.M. Blanquer et al., "Quorum: Flexible Quality of Service for Internet Services," Second Symposium on Networked Systems Design and Implementation (NSDI'05), 16 pages, 2005.

S. Buchholz et al., "Replica Placement in Adaptive Content Distribution Networks," ACM Symposium on Applied Computing (SAC'04), pp. 1705-1710, Mar. 2004.

A. Chandra et al., "Quantifying the Benefits of Resource Multiplexing in On-Demand Data Centers," First Workshop on Algorithms and Architectures for Self-Managing Systems, 6 pages, Jun. 2003.

A. Fox et al., "Cluster-Based Scalable Network Services," Symposium on Operating Systems Principles, (SOSP), 1997.

G.C. Hunt et al., "The Coign Automatic Distributed Partitioning System," Proceedings of the 3rd Symposium on Operating System Design and Implementation (OSDI'99) pp. 1-14, Feb. 1999.

A. Karve et al., Dynamic Placement for Clustered Web Applications, World Wide Web Conference Committee (WWW2006), 10 pages, May 2006.

T. Kimbrel et al., "Dynamic Application Placement Under Service and Memory Constraints," International Workshop on Efficient and Experimental Algorithms, pp. 1-10, 2005.

R. Levy et al., "Performance Management for Cluster Based Web Services," Proceedings of the International Symposium on Integrated Network Management, pp. 247-261, Mar. 2003.

G. Pacifici et al., "Managing the Response Time for Multi-Tiered WEb Applications," IBM REsearch Report, Computer Science, Technical Report RC 23651, pp. 1-16, Jul. 2005.

H. Shachnai et al., "Noah's Bagels—Some Combinatorial Aspects," Proceedings of the 1st International Conference on Fun with Algorithms, pp. 1-18, 1998.

H. Shachnai et al., "On Two Class-Constrained Versions of the Multiple Knapsack Problem," Algorithmica, vol. 29, No. 3, pp. 1-28, 2001.

K. Shen et al., "Integrated Resources Management for Cluster-Based Internet Services," Proceedings of the 5th Symposium on Operating Systems Design and Implementation, (OSDI'02), Dec. 2002.

B. Urgaonkar et al., "Resource Overbooking and Application Profiling in Shared Hosting Platforms," Proceedings of the 5th Symposium on Operating Systems Design and Implementation, (OSDI' 02), pp. 1-15, Dec. 2002.

\* cited by examiner

| Order Amount | YTD |
|---|---|
| Cherrier, Winona T. | 3,667,646.00 |
| Fon, Chin-Tsai | 2,599,555.94 |
| Judson, Georgia E. | 21,428,086.02 |
| Laermans, Giele | 12,527,036.86 |
| Laponder, Maria | 2,680,743.04 |
| McHugh, Darnell B. | 3,612,260.36 |
| Miller, Robin A. | 2,841,856.07 |
| Peppen, Jacques W. | 2,692,596.55 |
| Sharpe, Ellen | 2,954,198.00 |

Figure 9

| Order Amount | YTD |
|---|---|

Figure 10

| Order Amount | YTD |
|---|---|
| Cherrier, Winona T. | 0.00 |
| Fon, Chin-Tsai | 0.00 |
| Judson, Georgia E. | 1,125.00 |
| Laermans, Giele | 894.00 |
| Laponder, Maria | 1,579,032.04 |
| McHugh, Darnell B. | 0.00 |
| Miller, Robin A. | 0.00 |
| Peppen, Jacques W. | 0.00 |
| Sharpe, Ellen | 0.00 |

Figure 11

SYSTEM AND METHOD FOR LOCKING CONTEXT OF SETS OF MEMBERS IN CROSSTABS

FIELD OF THE INVENTION

The disclosed embodiments relate to exploration and analysis of Online Analytic Processing (OLAP) and multidimensional data sources, and specifically to a system and method for locking context of a set of members in a crosstab.

BACKGROUND OF THE INVENTION

In the Business Intelligence (BI) computer applications domain, business decision makers use analytical software to pose operational performance questions as queries against multi-dimensionally modeled business databases and data warehouses. These multi-dimensional models or cubes and analysis software tools are based on Online Analytic Processing (OLAP) concepts and technology. The analysis activity typically involves creation and manipulation of a cross-tabular (also called "crosstab") using queries which filter relevant data in the databases and data warehouses. A crosstab contains various dimensional and measure members.

With OLAP crosstabs, filtered sets of members are dependent on the context of the entire report because in dimensional algebra, every dimension participates in the crosstab query expression. If a member is not explicitly specified for a dimension in a query expression, then the default member for that dimension is implied. When the global context of the report changes, the filtered sets of members also change. There is no way to prevent a set of members from changing. That is to say, there is no way to specify a unique context that is specific to one filtered set, that context being shielded from changes to the global report context.

When a user wishes to create a static (i.e., unchanging) set of members for an axis of a crosstab, the user needs to specify a hard-coded list. That is, the user manually selects the members and inserts them into the crosstab. This approach creates an unchanging list of members that is impervious to global report context changes. This approach, however, has a major shortcoming in that the only type of set that supports this behaviour is one that is statically defined. This is undesirable in the case where the user wants the set to update itself if and only if the data in the underling cube changes, and not when the report context is modified.

It is therefore desirable to provide a mechanism for the ability for a user to define a filtered crosstab edge that is not affected by context anywhere else in the report.

SUMMARY OF THE INVENTION

It is an object of the invention to provide an improved system and method for OLAP and multidimensional exploration and analysis.

The invention uses a mechanism to lock the context of a filtered set of members in a crosstab, allowing update values of the set based on data changes in its underlying data source, but preventing the set from changing when the global context of the report changes.

In accordance with an aspect of the invention, there is provided a context locking system for locking context of a set of members in a crosstab for data exploration and analysis. The context locking system comprises a lock request manager, a context information manager and a locking manager. The lock request manager is provided for receiving a request for locking context of a selected set of members in a crosstab which contains data retrieved from a data source. The context information manager is provided for collecting context information of the selected member set. The locking manager is provided for locking the context of the selected set based on the context information during further exploration or analysis of the crosstab, while allowing changing of data based on data changes in the data source.

In accordance with another aspect of the invention, there is provided a method of locking context of a set of members in a crosstab for data exploration and analysis. The method comprises receiving a request for locking context of a selected set of members in a crosstab which contains data retrieved from a data source; collecting context information of the selected member set; and locking the context of the selected set based on the context information during further exploration or analysis of the crosstab, while allowing changing of data based on data changes in the data source.

In accordance with another aspect of the invention, there is provided a computer readable medium storing instructions or statements for use in the execution in a computer of a method of locking context of a set of members in a crosstab for data exploration and analysis. The method comprises receiving a request for locking context of a selected set of members in a crosstab which contains data retrieved from a data source; collecting context information of the selected member set; and locking the context of the selected set based on the context information during further exploration or analysis of the crosstab, while allowing changing of data based on data changes in the data source.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 9 is a diagram showing an example crosstab;

FIG. 10 is a diagram showing another example crosstab; and

FIG. 11 is a diagram showing another example crosstab.

DETAILED DESCRIPTION OF PREFERRED EMBODIMENTS

Figure 1:
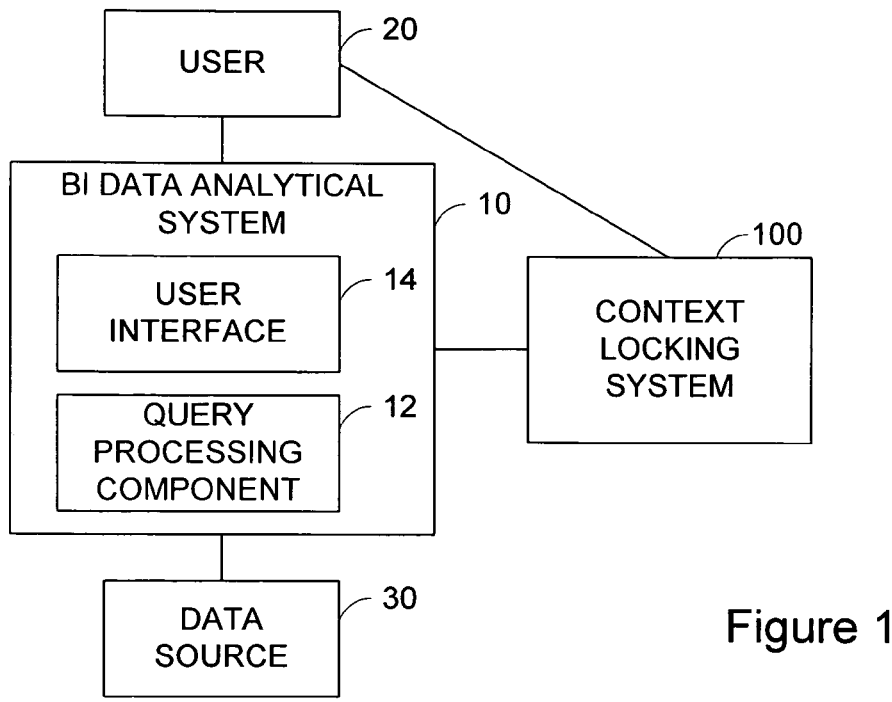
FIG. 1 is a block diagram showing environments of a context locking system in accordance with an embodiment of the present invention.

Referring to FIG. 1, a context locking system 100 in accordance with an embodiment of the invention.

The context locking system 100 provides to a business intelligence (BI) data analytical system 10 functions for locking context of selected sets of members in crosstabs. The analytical system 10 has a user interface 14 and a query processing component 12. The user interface 14 generates user requests of data based on gestures of a user 20 and presents reports including crosstabs. The query processing component 12 processes queries based on the user requests to retrieve relevant data from one or more data sources 30 storing BI data for an organization. Data sources 30 may be multi-dimensionally modeled business databases and/or data warehouses. For OLAP, the analytical system 10 typically creates OLAP cubes based on underlying databases and/or data warehouses. In this description, the data sources 30 include such cubes. While FIG. 1 shows the context locking system 100 as a separate element from the BI data analytical system 10, in a different embodiment, the context locking system 100 may be provided as part of the BI data analytical system 10 as described below.

A crosstab contains various dimensional members and measure members. A user 20 may manipulate one or more members of a crosstab as a set, and define the set of members collectively to explore and analysis data. During the course of an analysis session, a user may invest a significant amount of time in creating a filtered set definition that results in a set of members that the user wishes to maintain as a constant for further analysis. For example, the user may use such a constant set as a baseline to compare against other sets, or use the constant set as a constant with other elements placed against each other for comparison. The context locking system 100 allows the user to lock the definition or context of such a set of members for further exploration and analysis of data in the data sources 30.

The context locking system 100 provides a mechanism through which the user can define a set of members with an expression based filter that depends on data values in the data sources 30 so that updates to the data in the data sources 30 are reflected to the set, but other context changes in the report are not reflected by the member set.

Figure 2:
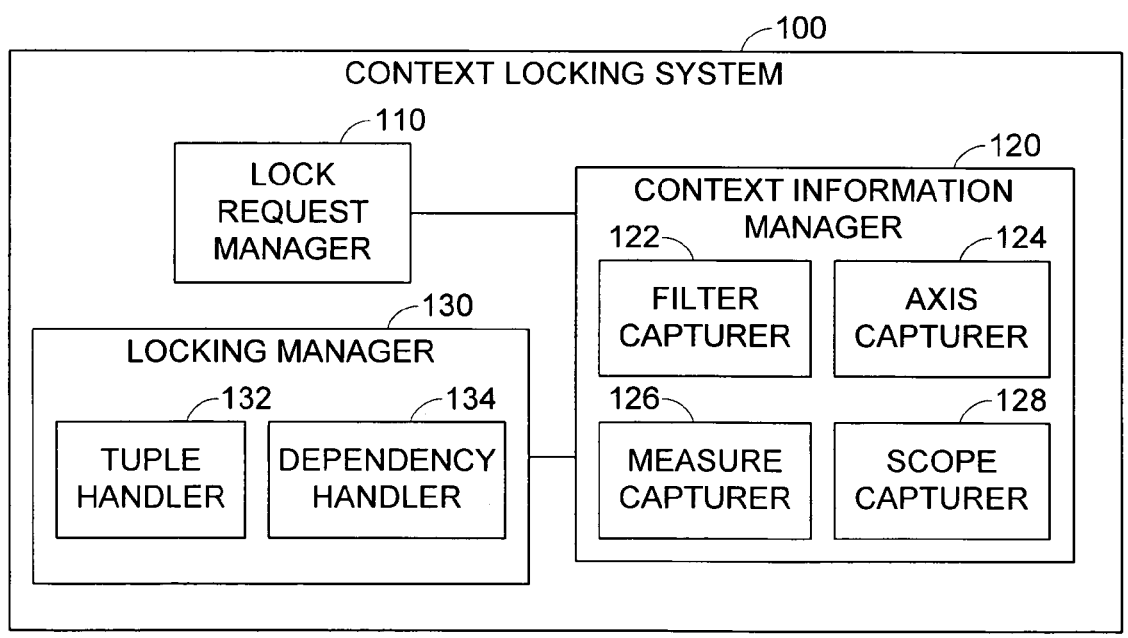
FIG. 2 is a block diagram showing components of the context locking system.
Figure 3:
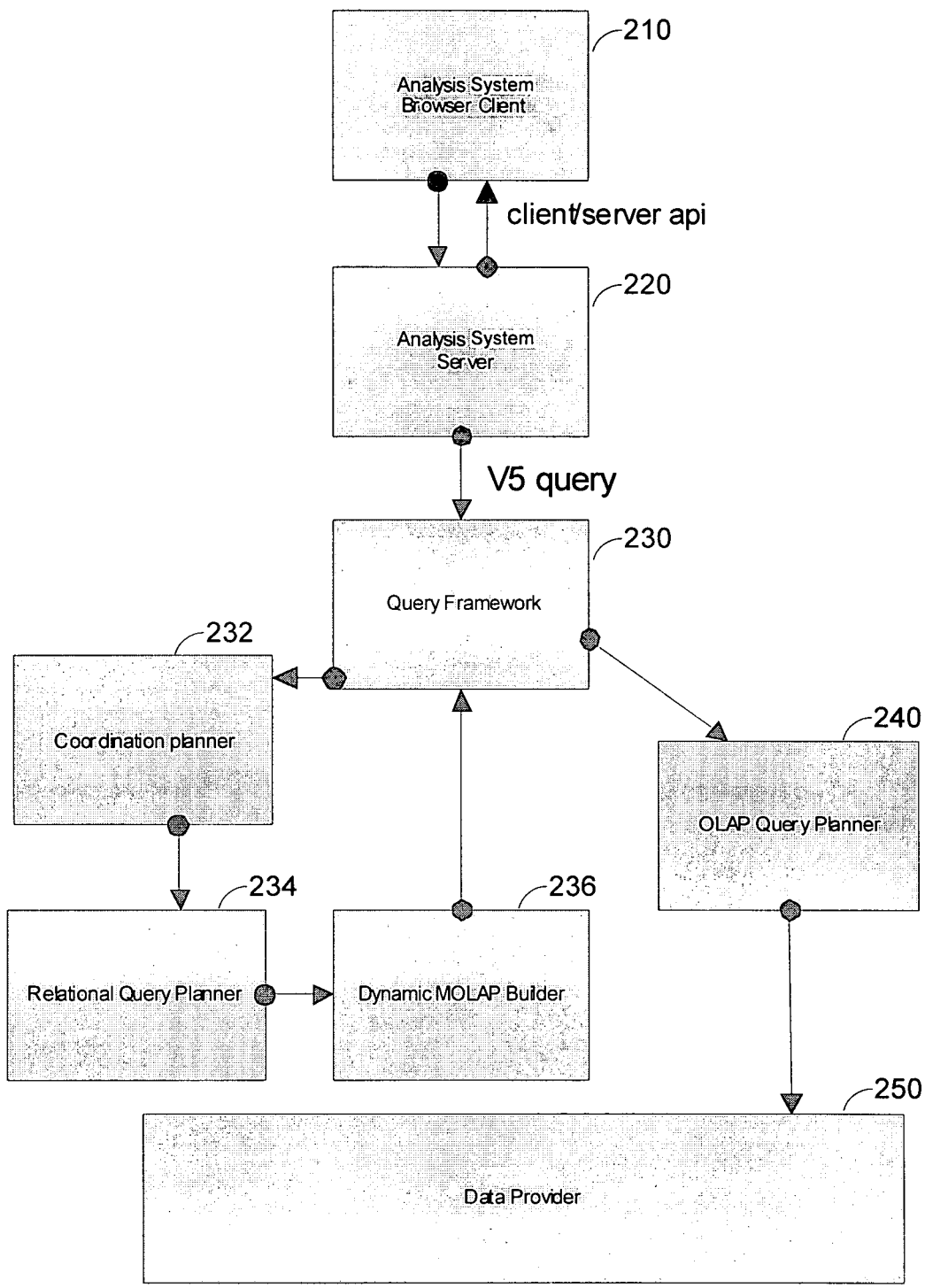
FIG. 3 is a block diagram showing a context locking system in accordance with another embodiment of the present invention.

FIG. 2 shows an embodiment of the context locking system 100. The context locking system 100 has a lock request manager 110, a context information manager 120, and a locking manager 130.

The lock request manager 110 allows a user to request to lock a selected set of members in a crosstab directly or through the user interface 14 of the analytical system 10. The lock request manager 110 takes the lock request for processing, and returns to the analytical system 10 the request with locked features.

The context information manager 120 collects information relating to context of the selected set in the crosstab.

The locking manager 130 determines the exact context to be locked based on the gathered context information, and provides that locked context to the lock request such that the locked context overrides the global context for the selected set in future crosstabs generated based on the current crosstab.

The context information manager 120 captures and saves the context information from the crosstab and the analytical system 10. The context information manager 120 may have a filter capturer 122, an axis capturer 124, a measure value capturer 126 and a scope capturer 128. The filter capturer 122 captures the current filter context applied to the selected set. The axis definition capturer 124 captures the definitions of the opposite axis of the crosstab. The measure value capturer 126 captures the actual value of any current default measure in the selected set. The scope capturer 128 captures the actual value of the current scope of the crosstab, such as sorting settings. The context information manager 120 may have different information capturers in a different embodiment.

The locking manager 130 may have a tuple handler 132 and a dependency handler 134. The tuple handler 132 handles provision of the locked elements to a tuple whose context is to be locked. The locked elements include the captured current filter context to override any future filter context, and the captured opposite axis definition for future filters. The locked elements may also include the captured values of any default measures and scope for changing corresponding default values in future crosstabs. Thus, the tuple handler 132 makes the tuple independent from context changes in the crosstab.

The dependency handler 134 handles dependency of the selected member set to one or more other member sets in the crosstab. It removes dependency and defines the set independently. For example, when the selected set is nested within other set, the definition of the selected set depends on the definition of the other set. In this case, the dependency handler 134 changes the definition of the selected set to be fixed to the current definition of the other set.

Since the locking manger 130 locks the context of the selected set, rather than the values of the selected set, the context locking system 100 allows the selected set to change when the data in the source 30 is updated, but it does not allow the selected set to change when the report context changes. This enhances the paradigm for data comparison that is fundamental to the OLAP exploration and analysis experience.

Thus, the context locking system 100 provides the ability for a user to define a filtered crosstab edge that is not affected by context anywhere else in the report. The user can specify a complete and unique context for a filtered set that is independent of any context defined elsewhere for a report.

Referring to FIGS. 3-8, a BI data analytical system 200 incorporating a context locking system in accordance with another embodiment of the invention is now described.

In this embodiment, the BI data analytical system 200 is implemented with a client/server architecture. The BI data analytical system 200 has an analysis system browser client 210, an analysis system server 220 and a query processing component including a query framework 230, a coordination planner 232, a relational query planner 234, a dynamic Multidimensional On-line Analytical Processing (MOLAP) builder 236, an OLAP query planner 240 and one or more data providers 250.

The query framework 230 verifies and prepares queries so that the resultant query can be executed by the data providers 250 on the relevant data sources 30. A query may include relational components and multidimensional components. The query framework 230 uses the coordination planner 232, the relational query planner 234 and the dynamic MOLAP builder 236 for the query preparation. The coordination planner 232 divides the query into components, and generates an execution plan of these components. The relational query planner 234 prepares the relational components of the query for execution. The dynamic MOLAP builder 236 dynamically builds MOLAP query components for the multidimensional components of the query. The OLAP query planner 240 prepares the OLAP components of the query for execution, and sends to the prepared OLAP components to the relevant data provider 250 for execution using an OLAP cube created by the analysis system.

The analysis system client/server 210, 220 enable the context locking feature through the concept of "locked sets". When a crosstab is presented, the analysis system client 210 allows the user to elect to hold the context for a specific generated set through a properties dialog. The analysis system client 210 translates this user gesture into a request to the analysis system server 220 component which then collects the entire relevant context that is involved in creating the set in question, and generates a system query. The system query is called "V5 query" in FIGS. 3-8. The system query specification provides a function called "completeTuple". The completeTuple function provides the ability to automatically complete a tuple. Completing a tuple involves defining a representative member of each and every dimension in the OLAP cube. If the exact context of the locked set involves specific non-default members of one or more dimensions, then every other dimension that is not represented in the exact context is made to have its default member specified in the completeTuple function. This explicit specification of a representative member from each dimension prevents other global context in the report from influencing the context of the locked set in future crosstabs.

Thus, the context locking is achieved by using the completeTuple function of the system query specification, which is exposed through the lock set feature of the analysis system in this embodiment.

Figure 4:
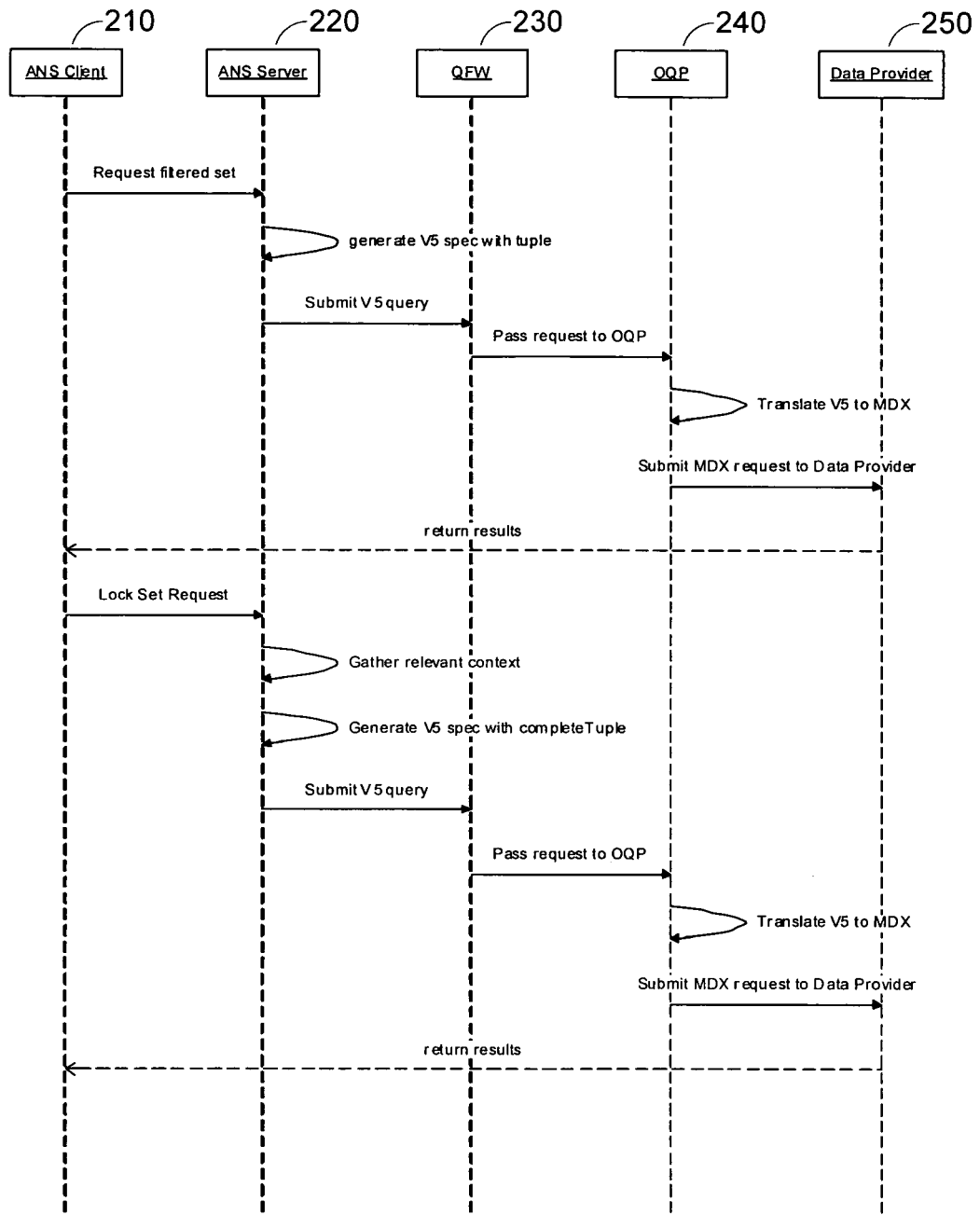
FIG. 4 is a sequence diagram showing an example of workflow between components of the context locking system.

FIG. 4 shows a sequence diagram describing the workflow between the components of the analytical system 200. In order to generate a crosstab, the analysis system client 210 sends a request for a filtered set of members to the analysis system server 220. This request is typically in a language that is easy for users to understand, but is not directly applicable to the data sources 30. Upon the receipt of the filtered set request, the analysis system server 220 converts the request and generates a system query in a language that can be processed to apply to the data sources 30. The analysis system server 220 submits the system query to the query framework 230. The query framework processes the system query and passes it to the OLAP query planner 240. The OLAP query planner 240 translates the system query to a Multi Dimensional expressions (MDX) request, and submits the MDX request to the data provider 250 which can execute the MDX request. In response to the MDX request, the data provider 250 accesses the data source 30 to retrieve relevant data, and returns the results to the analysis client 210. The analysis system client 210 presents to the user the results as a report in a form of a crosstab.

When the user selects a set of members in the crosstab to lock, the analysis system client 210 sends a "lock set" request to the analysis system server 220. Upon the receipt of the lock set request, the analysis system server 220 gathers relevant context information of the set in the crosstab, and generates a system query specification with the completeTuple function, as further described below.

The analysis system server 220 submits the system query to the query framework 230, which processes and passes the system query to the OLAP query planner 240. The OLAP query planner 240 translates the system query to a MDX request, and submits it to the data provider 250. The data provider 250 executes the MDX request, and returns the results to the analysis client 210. The analysis system client 210 presents the results as a crosstab, in which the selected set of the members is locked according to the lock set request.

Figure 5:
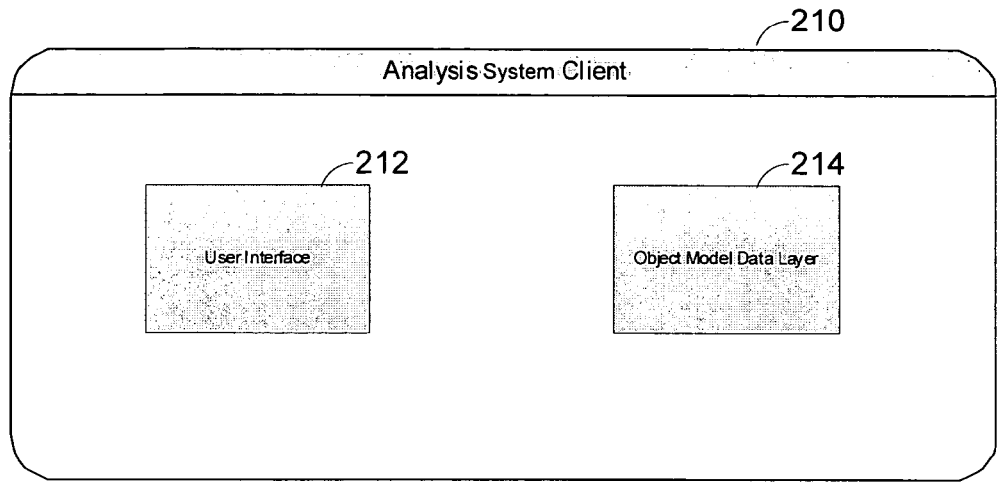
FIG. 5 is a block diagram showing components of an analysis system client.

FIG. 5 shows the major components of the analysis system client 210. The analysis system client 210 maintains a user interface 212 and an object model data layer 224. The user interface 212 is used for data input by users, and for generating user interface requests based on user inputs. The object model data layer 214 converts user interface requests into server requests.

Figure 6:
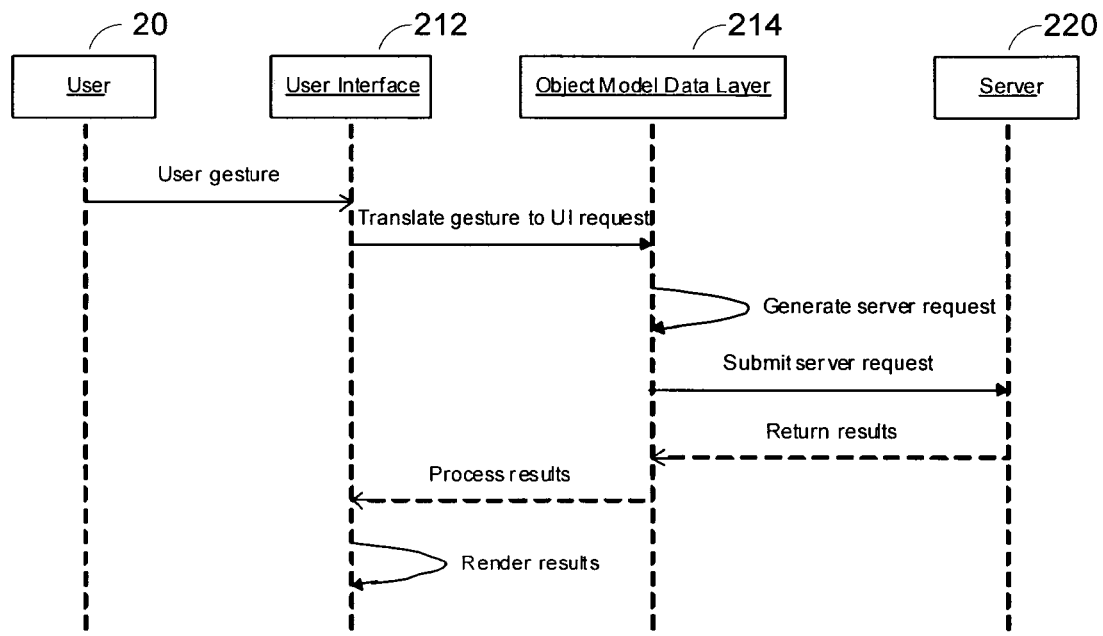
FIG. 6 is a sequence diagram showing an example of workflow between components of the analysis system client.

As shown in FIG. 6, the user is able to provide a user gesture to create a crosstab using the interface 212. The interface 212 translates the gesture to a user interface request for the object model data layer 214. The object model data layer 214 generates a server request based on the user interface request, and submits the server request to the analysis system server 220. When the server 220 returns the results of the server request to the object model data layer 214, it processes the results to the user interface 212. The user interface 212 renders the results and presents the requested crosstab to the user 20.

Once a crosstab creation is accomplished, the analysis system client 210 enables further options and makes them available for the user 20 to manipulate the crosstab. One of those options is a lock set property.

If the user selects a specific set of members in the crosstab, and then chooses the "lock set" property, the analysis system client 210 sends a request to the analysis system server 220, asking the server 220 to lock the context for the selected set.

Figure 7:
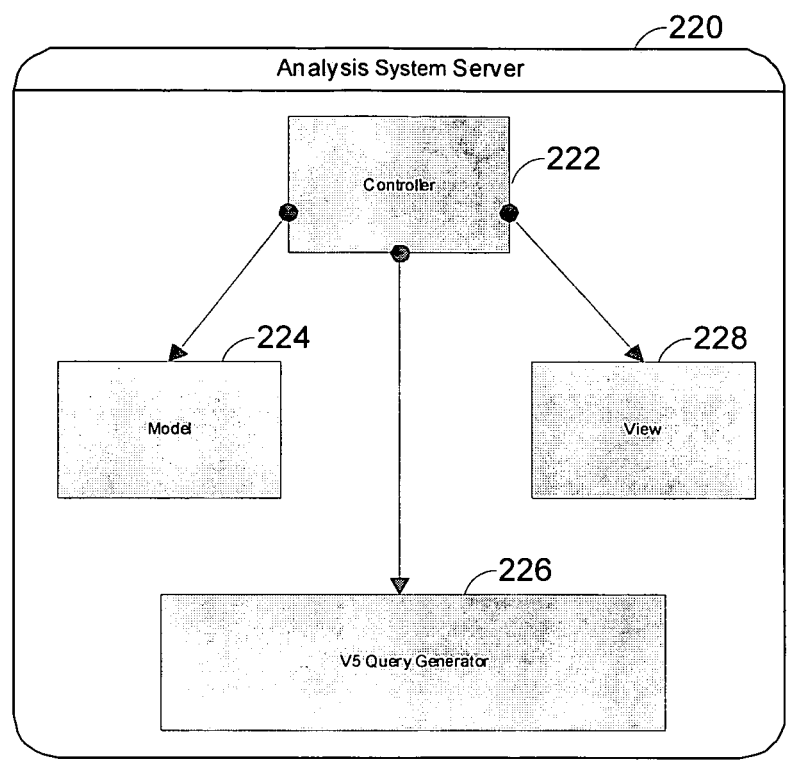
FIG. 7 is a block diagram showing components of an analysis system server.

FIG. 7 is a block diagram outlining the major components in the analysis system server 220. The analysis system server 220 has a controller 222, a model 224, a system query generator 226 and a view component 228. The controller 222 controls the overall functions of the server 220 and the other components in the server 220. The model component 224 generates and stores object models representing elements and relations among the elements in the requests received from the analysis system client 210. The system query generator 226 generates system queries based on the received requests. The view component 228 creates client views of query results.

Figure 8:
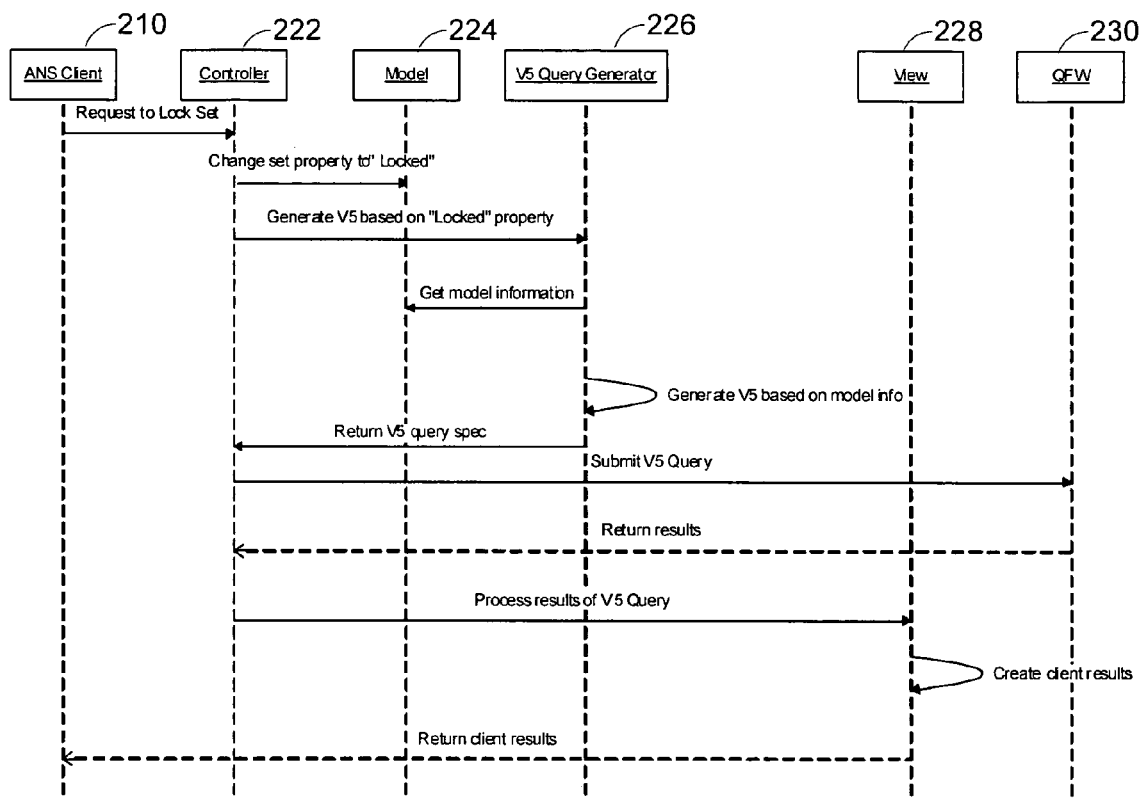
FIG. 8 is a sequence diagram showing an example of workflow between components of the analysis system server.

FIG. 8 shows how the lock set request from the analysis system client 210 is processed on the analysis system server 220. When the analysis system client 210 sends to the analysis system server 220 a request to lock the context for the selected set, the controller 222 changes the property of the selected set to "Locked" in the model 224. The controller 222 also generates a system query specification based on the "locked" property, and sends it to the system query generator 226.

The system query generator 226 checks the model 224 and obtains information, e.g., default members, for the dimensions in the model that are not represented in the completeTuple function. In order to lock the selected set of members and freeze the definition of the set, the system query generator 226 captures and saves the current filter context within the set to override future filter context values of the selected set in future crosstabs. The system query generator 226 also captures and saves the opposite axis definition so that the system query generator 226 can use this opposite axis definition for filters that may be based on the opposite axis calculations as required in future crosstabs. The system query generator 226 also saves an actual value of the current default measure, if any, in order to change any default measures used in sorting or filtering to be this actual value of the current default measure in future crosstabs. The system query generator 226 may also save an actual value of the current scope in order to change the default scope used in sorting or filtering to be this actual value of the current scope in future crosstabs.

Some sets have definitions that are related to other sets by their position within the crosstab edge, such as zero suppress, inner nested sets with filters enabled, and inner nested sets from same dimension. For these sets where the inner definition is based on the outer definition, the system query generator 226 removes the dependency during the lock, and makes the definitions fixed to the summary of the outer definition. For example, after the lock action, bottom 5 children of the Locations member nested within the "children of Products member" set no longer shows the bottom 5 locations for each product, but the bottom 5 locations for all products (overall) nested within each product.

The system query generator 226 generates a system query based on the model information thus obtained, and sets up a completeTuple function in the system query. The system query generation then supports the lock concept through use of a completeTuple( ) function in the system query specification, as further described below.

During the system query generation, the system query generator 226 uses the saved context when generating context for the filter and order tuples for the selected set in future crosstabs. In addition, the system query generator 226 replaces the tuple function for the selected set in future crosstabs with the completeTuple function to indicate that any unspecified dimension is to override the context area of future crosstabs.

The system query generator 226 determines the correct information to be placed in the completeTuple function, using the steps described in the "Generate query handling system based on model info" call, as shown in FIG. 8. The correct information is determined algorithmically in the analysis system server 220 by examining each portion of the object model that can potentially influence the results of the locked set. It examines the contents of the slicer used to generate the crosstab, the definition of the opposite axis, any outer nested levels of the set being locked, the measure values used to determine the results of the selected set, and any potential dependencies that influence the selected set. The system query generator 226 includes any member of any dimension that influences the results of the set to be locked in the completeTuple function.

The system query generator 226 returns the generated system query specification to the controller 222, which submits the system query to the query framework 230. When the query framework 230 returns the results of the system query execution to the controller 222, the controller 222 processes the results to the view component 228. Based on the received results, the view component 228 creates client results, and returns the client results to the analysis system client 210 for client's viewing.

Referring back to FIGS. 3 and 4, the query framework 230, upon receiving the system query specification, verifies that the query is valid, and then passes the system query specification to the OLAP query planner 240 for processing.

The OLAP query planner 240 translates the system query specification into a MDX request that can be executed by the data provider 250 to retrieve relevant data from the data sources 30. For the completeTuple function, the OLAP query planner 240 takes several steps so that this function can be properly represented in the MDX request. Since "completeTuple" is not valid MDX syntax, but performs a similar but expanded role to the MDX "tuple" function, the OLAP query planner 240 carries out the following steps or algorithm to transform the completeTuple function and operands relating to the selected set into a tuple function in MDX.

In the OLAP query planner 240, the completeTuple( ) function generates a tuple( ) using the arguments to completeTuple plus the dimension default members for any dimension mentioned in detailFilter or summaryFilter clauses (except for the dimensions of completeTuple( ) arguments). The arguments to the completeTuple function are the members that reflect the context of the set being filtered, and only that context. If a dimension does not have a representative member in the list of arguments, then it is given that the default members of those dimensions not being represented are used for the context. A detailFilter or summaryFilter is a filter applied against a report that could potentially provide context for the results of the selected set to be locked, much the same way as the slicer. If there is a crosstab in a report that contains a detailFilter or summaryFilter, the OLAP query planner 240 includes any members specified in these filters in the list of members for the completeTuple function so that these members' dimensions are represented exactly once in the final request. The OLAP query planner 240 obtains these members from the filters since the detailFilter and summaryFilter elements are not part of the analysis system object model 224.

The OLAP query planner 240 generates a list of dimensions of the arguments to completeTuple (dimList1), generates a list of dimensions mentioned in the detailFilter and summaryFilter clauses (dimList2), and removes from dimList2 any dimension in dimList1. Then, for each dimension in dimList2, the OLAP query planner 240 appends dimension.defaultMember to the arguments. Thus, the MDX request generated by the OLAP query planner 240 contains MDX tuple( ) function including some dimensions with dimension.defaultMember appended to their arguments.

The OLAP query planner 240 sends the resultant MDX request to the data provider 250. The data provider 250 then executes the MDX tuple( ) function which properly represents the exact scoped context for the set that is locked.

Referring to FIGS. 9-11, an example of locking the context of a selected set is now described using a business case where a manager has a crosstab that shows his top global salespeople with their Order Amount numbers for the current Year to Date. This manager may want to see how these top sellers are performing in the Asian markets. The manager creates a crosstab with the relevant information added; top global sales people on rows, Year-to-Date time period on columns, and Order Amount as a measure. In this case, the manager has decided that his top worldwide salespeople are those who have Order Amounts in excess of 2.5 million. FIG. 9 shows an example of the crosstab created.

Now the manager has a set of his best salespeople on the row axis, but the numbers in the crosstab are the global Order Amount values. What he wants to see are the numbers for only the Asian region. This is easily accomplished by using the slicer to filter the data values by the Asian region. Unfortunately, adding Asia to the slicer context changes the values that are being used by the filter defining the top salespeople (i.e., it changes the global report context). This results in the crosstab shown in FIG. 10. Note that there are no salespeople on the row axis because the criteria for the set along the rows is all salespeople with Order Amount greater than 2.5 million for YTD and the current global report context. Since the data is now filtered by the Asian market, all the data values dropped below 2.5 million, and no salespeople passed the filter criteria.

In order for the set of top salespeople to be preserved when the data is filtered by the slicer, the context for the filtered set needs to be shielded from it. This can be accomplished by using the "completeTuple" function that sets the context for the filtered set of salespeople on the rows. What "completeTuple" does is it allows the report author to set the specific context for a filtered set that is unaffected by any changes done elsewhere in the report. The only thing that changes the set is the data that is referenced by the filtered set expression.

In this case, the business manager changes the filter expression for his salespeople to use "completeTuple", and the resulting crosstab becomes as shown in FIG. 11.

In this crosstab, the salespeople in the filtered row set are those with Order Amount greater than 2.5 million, yet none of the values shown in the crosstab actually pass the criteria. The context locking system 100, 200 allows the list to reflect the data value changes, but still not get affected by the fact that the values shown in the report are only for the Asia market. This feature cannot be achieved by creating a static list of those specific employees since as the year progresses, the YTD numbers may change and the employees that reach the 2.5 million mark may grow.

The context locking system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the context locking system are described separately, however, two or more elements may be provided as a single element, or one or more elements may be shared with other components in one or more computer systems.

What is claimed is:

1. A method that is implemented on a computer, the method comprising:
   receiving a request to create a constant filtered set definition to select a set of members in a crosstab, the crosstab including data retrieved from a data source;
   creating, with an expression based filter that depends on data in the data source, the constant filtered set definition;
   selecting, after the creation of the constant filtered set definition, the set of members in the crosstab based on the constant filtered set definition; and
   updating the set of members in the crosstab based on the constant filtered set definition and a change to the data in the data source without updating the set of members in the cross tab based on a change to a global definition corresponding to the crosstab such that the constant filtered set definition overrides the global definition.

2. The method as claimed in claim 1, further comprising:
   capturing and saving a current filter applied to the set of members; and
   capturing and saving a definition of an opposite axis of the crosstab.

3. The method as claimed in claim 2, further comprising:
   capturing and saving an actual value of any current default measure in the set of members; and
   capturing and saving an actual value of a current scope of the crosstab.

4. The method as claimed in claim 1, further comprising overriding a global definition corresponding to a future crosstab for the constant set of members.

5. The method as claimed in claim 4, wherein a tuple handler ensures that the constant filtered set definition remains constant for a tuple.

6. The method as claimed in claim 5, further comprising providing adding a default setting to an argument of the tuple to make the tuple independent from the change to the global definition corresponding to the crosstab.

7. The method as claimed in claim 4, wherein the future filter context, opposite axis definition with respect to future filters, and/or actual values of any default measures and/or scope are overridden with respect to changing corresponding default values in future crosstabs.

8. The method as claimed in claim 5, further comprising generating a query with a tuple completing function to complete a tuple by defining a representative member of each dimension in an OLAP cube representing the data source, and specifying a default member with respect to a dimension that is not represented in the set members.

9. The method as claimed in claim 8, wherein the query generating comprises obtaining an actual value of any current default measure from the OLAP cube.

10. The method as claimed in claim 1, further comprising handling dependency of the set of members to at least one additional set of members in the crosstab by removing the dependency.

11. The method as claimed in claim 10, further comprising changing the constant filtered set definition to be fixed to a current constant filtered set definition of an additional set of members.

12. A system comprising:
    a lock request manager, stored on one or more non-transitory computer readable storage medium and operated by a controller, that receives a request to create a constant filtered set definition to select a set of members in a crosstab, the crosstab including data retrieved from a data source; and
    an expression based filter, stored on one or more non-transitory computer readable storage medium and operated by the controller, that creates the constant filtered set definition and selects, after the creation of the constant filtered set definition, the set of members in the crosstab based on the constant filtered set definition so that an update to the set of members in the crosstab based on the constant filtered set definition and a change to the data in the data source is effectuated without updating the set of members in the crosstab based on a change to a global definition corresponding to the crosstab such that the constant filtered set definition overrides the global definition.

13. The system as claimed in claim 12, further comprising a context information manager that captures and saves a current filter applied to the set of members and captures and saves a definition of an opposite axis of the crosstab.

14. The system as claimed in claim 13, wherein the context information manager also captures and saves an actual value of any current default measure in the set of members and captures and saves an actual value of a current scope of the crosstab.

15. The system as claimed in claim 12, wherein a global definition corresponding to a future crosstab for the constant set of members is overridden.

16. The system as claimed in claim 15, further comprising a tuple handler ensures that the constant filtered set definition remains constant for a tuple.

17. The system as claimed in claim 16, wherein a default setting is added to an argument of the tuple to make the tuple independent from the change to the global definition corresponding to the crosstab.

18. The system as claimed in claim 15, wherein future filter context, opposite axis definition with respect to future filters, and/or actual values of any default measures and/or scope are overridden with respect to changing corresponding default values in future crosstabs.

19. The system as claimed in claim 15, a query is generated with a tuple completing function to complete a tuple by defining a representative member of each dimension in an OLAP cube representing the data source, and specifying a default member with respect to a dimension that is not represented in the set members.

20. The system as claimed in claim 19, wherein the query generating comprises obtaining an actual value of any current default measure from the OLAP cube.

21. A computer program product comprising a non-transitory computer readable storage medium having a computer readable program, wherein the computer readable program when executed on a computer causes the computer to:
  receive a request to create a constant filtered set definition to select a set of members in a crosstab, the crosstab including data retrieved from a data source;
  create, with an expression based filter that depends on data in the data source, the constant filtered set definition;
  select, after the creation of the constant filtered set definition, the set of members in the crosstab based on the constant filtered set definition; and
  update the set of members in the crosstab based on the constant filtered set definition and a change to the data in the data source without updating the set of members in the crosstab based on a change to a global definition corresponding to the crosstab such that the constant filtered set definition overrides the global definition.

22. The computer program product as claimed in claim 21, wherein the computer is further caused to:
  capturing and saving a current filter applied to the set of members; and
  capturing and saving a definition of an opposite axis of the crosstab.

23. The computer program product as claimed in claim 22, wherein the computer is further caused to:
  capturing and saving an actual value of any current default measure in the set of members; and
  capturing and saving an actual value of a current scope of the crosstab.

* * * * *